United States Patent
Warrier et al.

(10) Patent No.: US 12,091,268 B1
(45) Date of Patent: Sep. 17, 2024

(54) MOBILE MANIPULATION ROBOTIC SYSTEM

(71) Applicant: Rightbot Technologies, Inc., Wilmington, DE (US)

(72) Inventors: Abhinav Warrier, Mumbai (IN); Anurag Dutta, New Delhi (IN); Akash Singh, Telangana (IN)

(73) Assignee: Rightbot Technologies, Inc., Wilmington, DE (US)

( * ) Notice: Subject to any disclaimer, the term of this patent is extended or adjusted under 35 U.S.C. 154(b) by 0 days.

(21) Appl. No.: 18/603,798

(22) Filed: Mar. 13, 2024

Related U.S. Application Data

(60) Provisional application No. 63/454,469, filed on Mar. 24, 2023.

(30) Foreign Application Priority Data

Mar. 14, 2023 (IN) .............................. 202311016915

(51) Int. Cl.
*B65G 67/08* (2006.01)
*B25J 5/00* (2006.01)

(52) U.S. Cl.
CPC .............. *B65G 67/08* (2013.01); *B25J 5/007* (2013.01)

(58) Field of Classification Search
CPC .................................. B65G 67/08; B25J 5/007
See application file for complete search history.

(56) References Cited

U.S. PATENT DOCUMENTS

| | | | | |
|---|---|---|---|---|
| 2015/0336272 A1* | 11/2015 | Drew | .................. | E04F 21/1872 414/737 |
| 2023/0356387 A1* | 11/2023 | Kalouche | ............... | B25J 19/021 |
| 2023/0365357 A1* | 11/2023 | Campbell | .............. | B65G 21/14 |
| 2023/0415345 A1* | 12/2023 | Zizka | ....................... | B25J 5/007 |
| 2024/0002163 A1* | 1/2024 | Menon | ................... | B65G 41/02 |

OTHER PUBLICATIONS

Spectrum.ieee.org [online], "Anyware Robotics' Pixmo Takes Unique Approach to Trailer Unloading," Mar. 5, 2024, retrieved on Apr. 4, 2024, retrieved from URL<https://spectrum.ieee.org/anyware-robotics-pixmo>, 6 pages.
The Robot Report [Online], "Anyware Robotics new Pixmo unloading with addon convey," Mar. 5, 2024, retrieved on Apr. 4, 2024, <https://www.youtube.com/watch?v=PcwIQfvfr6Y>, 89 pages [Video Submission].

* cited by examiner

*Primary Examiner* — Saul Rodriguez
*Assistant Examiner* — Ashley K Romano
(74) *Attorney, Agent, or Firm* — Fish & Richardson P.C.

(57) ABSTRACT

A robotic system configured for performing a task of loading and unloading goods. The robotic system comprises a mobile base assembly, an actuation assembly coupled to the mobile base assembly and configured to move with respect to the base assembly, and a head assembly mounted atop the actuation assembly or the mobile base assembly. The head assembly comprises one or more sensors configured to collect data related to an operation environment and the task to be performed. The robotic system further comprises a dynamic conveyor coupled to the mobile base assembly. The dynamic conveyor comprises a platform. The robotic system furthermore comprises a control unit configured to move the platform to align the platform with respect to the goods to be loaded or unloaded. Further, the robotic system comprises a manipulation arm coupled to the actuation assembly or the dynamic conveyor and configured to move to perform the task.

30 Claims, 6 Drawing Sheets

MOBILE MANIPULATION ROBOTIC SYSTEM

CROSS-REFERENCE TO RELATED APPLICATIONS

This application claims the benefit of an earlier filing date under 35 U.S.C. § 120 to U.S. Provisional Application No. 63/454,469, filed Mar. 24, 2023, and the benefit of priority under 35 U.S.C. § 119 to Indian Application No. 202311016915, filed Mar. 14, 2023. The entire contents of each of these applications are incorporated herein by reference.

TECHNICAL FIELD

The present disclosure relates to the field of robots. More particularly, the present disclosure relates to a robotic system for loading and/or unloading of goods from trucks, ocean containers, and other types of storage and transport.

BACKGROUND

The information in this section merely provides background information related to the present disclosure and may not constitute prior art(s) for the present disclosure.

Robots can be configured to perform tasks in warehouse and dockyard environments. However, robots interacting in warehouse and dockyard environments typically have complex mechanical designs, are too large and heavy to be practically fielded in loading/unloading settings of trucks or ocean containers and case picking in warehouses, and are expensive to purchase and maintain. Robots configured to perform useful work in warehouse and dockyard environments under autonomous or remote operative control can further increase design complexity and costs.

Traditional mobile manipulator robotic systems include a wheeled base, one or more dexterous robot arms, and a suite of sensors, such as a 3D camera and/or a light detection and ranging (Lidar) sensor. The kinematic design of dexterous robot arms is typically derived from industrial automation applications and can include a series of five to seven revolute joints located between a proximal shoulder joint and a distal wrist joint. As such, the actuator for each joint must be strong enough to support its distal joints against gravity and dynamic loads. This leads to an amplifying effect where the distal joints, in order to be strong enough to support a moderate payload at the wrist, become large, heavy, and unsafe. When such a heavy arm is deployed in a mobile robot, the mobile robot base must now increase its footprint and mass sufficiently to ensure stability against tipping. This in turn can limit the reachable workspace of the robot, as a long arm that extends beyond the base footprint can cause tipping. In addition, the bulky nature of these dexterous arms can cause them to obscure the sensors' view of the environment, limiting the robot's ability to accomplish tasks. For instance, in known traditional robotic systems, a motor is typically provided in the structure of the robot, and said motor is responsible for controlling operations of all the joints or motion points of the robot. In order to control operations of all the joints or motion points of the robot, a large size motor is required, and thus high torque is required to be generated by the motor.

Further, conveyors are separately provided in the dockyard for loading/unloading of goods/samples from the trucks or ocean containers, and extra time and effort is consumed in lifting the samples from the truck or ocean containers and placing the sample on the conveyor for further transfer.

As a result, such robots may be financially unattainable for users who need to rely on devices in unloading/loading of trucks or ocean containers or mixed SKU palletization and de-palletization or case picking activities. In addition, traditional robots can have limited reach and manipulation capabilities relative to important tasks in warehouse and dockyard environments. Accordingly, there is a need for simple, compact, and safe robotic systems capable of operating autonomously or via remote teleoperation to perform tasks efficiently and safely for activities like unloading/loading of trucks or ocean containers, mixed SKU palletization or de-palletization or case picking in warehouses.

SUMMARY

The one or more shortcomings of the prior art are overcome by the system/assembly as claimed, and additional advantages are provided through the provision of the system/assembly as claimed in the present disclosure. Additional features and advantages are realized through the techniques of the present disclosure. Other embodiments and aspects of the disclosure are described in detail herein and are considered a part of the claimed disclosure.

Pursuant to an aspect of the present disclosure, in an embodiment, a robotic system configured for performing a task of loading and unloading goods, is disclosed. The robotic system comprises a mobile base assembly, an actuation assembly coupled to the mobile base assembly and configured to move with respect to the base assembly, and a head assembly mounted atop the actuation assembly or the mobile base assembly. The head assembly comprises one or more sensors configured to collect data related to an operation environment and the task to be performed. The robotic system further comprises a dynamic conveyor coupled to the mobile base assembly. The dynamic conveyor comprises a platform. The robotic system furthermore comprises a control unit configured to move the platform to align the platform with respect to the goods to be loaded or unloaded. Further, the robotic system comprises a manipulation arm coupled to the actuation assembly or the dynamic conveyor and configured to move to perform the task.

In a non-limiting embodiment of the present disclosure, the dynamic conveyor comprises a plurality of sensors and the control unit. The control unit is communicatively coupled to the plurality of sensors. The plurality of sensors is configured to collect data associated with a position of the goods in a container. Further, the control unit is configured to actuate, by an actuator, the platform to align the platform of the dynamic conveyor with respect to the goods, based on the data received from the plurality of sensors.

In a non-limiting embodiment of the present disclosure, the control unit is communicatively coupled to sensors in at least one of the mobile base assembly, the actuation assembly, the head assembly, or the manipulation arm for receiving additional data related to the operation environment and the task. The control unit is configured to align the platform with respect to the goods, based on the data received from the sensors in at least one of the mobile base assembly, the actuation assembly, the head assembly, or the manipulation arm.

In a non-limiting embodiment of the present disclosure, the dynamic conveyor comprises a platform comprising sets of rollers provided at a first end and a second end of the platform, and a conveyor belt adapted to rotate over the sets of rollers for conveying the goods, and a hinge assembly provided at the first end of the platform. The hinge assembly is configured to facilitate a pivotal movement of the platform relative to the mobile base assembly. The dynamic conveyor further comprises at least one connecting link comprising a first end coupled to a lower surface of the platform of the dynamic conveyor, and a second end movable along a rail unit on the mobile base assembly. A movement of the second end of the connecting links causes the platform to be raised or lowered.

In a non-limiting embodiment of the present disclosure, the robotic system comprises a container containing the goods. The dynamic conveyor extends along a full width of the container and up to a full height of the container.

In a non-limiting embodiment of the present disclosure, the dynamic conveyor comprises a hydraulic actuator or an electrical actuator.

In a non-limiting embodiment of the present disclosure, the dynamic conveyor comprises a scissors-type dynamic conveyor that comprises pairs of scissors-legs pivotally coupled to each other about scissors pivot axes. The scissors-type dynamic conveyor is adapted to extend and retract the pairs of scissors-legs along a vertical direction and a horizontal direction.

In a non-limiting embodiment of the present disclosure, the manipulation arm is configured to move linearly with respect to the dynamic conveyor.

In a non-limiting embodiment of the present disclosure, the dynamic conveyor forms an integral unit with the mobile base assembly.

In a non-limiting embodiment of the present disclosure, the manipulation arm is coupled to a lift carriage of the actuation assembly. The lift carriage is adapted to move the manipulation arm along a vertical axis of the actuation assembly.

In a non-limiting embodiment of the present disclosure, the actuation assembly comprises a translation drive system comprising a drive chain housed within a chain cartridge and operated by a drive motor. The translation drive system is configured to move the lift carriage and the manipulation arm along the vertical axis of the actuation assembly.

In a non-limiting embodiment of the present disclosure, the manipulation arm comprises a plurality of arm links and a manipulation payload pivotably coupled to one another and controlled by at least one motor.

In a non-limiting embodiment of the present disclosure, the manipulation payload comprises a vacuum cup or a modular gripping tool. The manipulation payload is configured to receive different modular gripping tools for different types of the goods.

In a non-limiting embodiment of the present disclosure, the actuation assembly is adapted to move linearly, by a first translation drive system, over the mobile base assembly along a horizontal plane, and/or rotate, by a rotational drive system, over the mobile base assembly, about a longitudinal axis of the actuation assembly.

In a non-limiting embodiment of the present disclosure, the first translation drive system comprises at least one upper guide affixed to a base plate of the actuation assembly, and at least one lower rail affixed to a top plate of the mobile base assembly. A first upper guide of the at least one upper guide is coupled to a corresponding lower rail to facilitate a linear movement of the actuation assembly with respect to the mobile base assembly.

In a non-limiting embodiment of the present disclosure, the first translation drive system comprises an actuator configured to move the at least one upper guide relative to the at least one lower rail to move the actuation assembly relative to the mobile base assembly.

In a non-limiting embodiment of the present disclosure, the rotational drive system comprises a bearing unit coupled to a base plate of the actuation assembly and a top plate of the mobile base assembly. The bearing unit comprises an outer race coupled to the top plate of the mobile base assembly, and an inner race coupled to the base plate of the actuation assembly. The inner race is rotatable with respect to the outer race in order to rotate the actuation assembly with respect to the mobile base assembly.

In a non-limiting embodiment of the present disclosure, the rotational drive system comprises a motor operatively coupled to the bearing unit and adapted to actuate rotation of the inner race with respect to the outer race.

In a non-limiting embodiment of the present disclosure, the mobile base assembly comprises a plurality of drive wheels. Each drive wheel is operable by a respective drive motor, to facilitate movement of the mobile base assembly.

In a non-limiting embodiment of the present disclosure, the drive motors are configured to operate in unison and independently of each other.

Pursuant to another aspect of the present disclosure, in an embodiment, a robotic system for handling objects is disclosed. The robotic system comprises a base, a manipulation arm mounted on the base and comprising at least two arm links pivotably coupled to one another, a vacuum unit at a distal end of the manipulation arm and configured to attach to a portion of the goods and a dynamic conveyor. The dynamic conveyer comprises a platform arranged adjacent to the base such that the manipulation arm is extendable over and across the platform, a motorized conveyer belt on the platform and configured to move goods placed on the motorized conveyer belt, and a motorized platform configured to be moved in a vertical direction. The robotic system further comprises at least one sensor configured to collect sensor data indicative of a first position of an object to be handled, and at least one control device. The at least one control device is configured to move the motorized platform up or down, based on the sensor data, to align the platform with the first position of the object, control the manipulation arm to attach to the object and move the object to or from the motorized conveyer belt while the platform is aligned with the first position of the object, and control the motorized conveyer belt to move the object.

In a non-limiting embodiment of the present disclosure, the motorized conveyer belt is oriented horizontally.

In a non-limiting embodiment of the present disclosure, the motorized conveyer belt is a first motorized conveyer belt, and the dynamic conveyer comprises an inclined motorized conveyer belt coupled to the first motorized conveyer belt and arranged downstream of the first motorized conveyer belt to receive the object moved by the first motorized conveyer belt.

In a non-limiting embodiment of the present disclosure, the inclined motorized conveyer belt, in a downstream direction, tilts downward from a vertical level of the first motorized conveyer belt.

In a non-limiting embodiment of the present disclosure, the first motorized conveyer belt extends along a first side of the base, and the inclined motorized conveyer belt extends along a second side of the base. The second side is adjacent to the first side.

In a non-limiting embodiment of the present disclosure, the first motorized conveyer belt and the inclined motorized conveyer belt are coupled via a platform having a rectangular top surface.

In a non-limiting embodiment of the present disclosure, the first motorized conveyer belt and the inclined motorized conveyer belt are driven by separate motors.

In a non-limiting embodiment of the present disclosure, the motorized mechanism comprises a pair of scissor legs pivotally coupled about a pivot axis, and pivoting of the pair of scissor legs about the pivot axis causes vertical movement of the platform.

In a non-limiting embodiment of the present disclosure, the motorized mechanism is hydraulically-driven or electrically-driven.

In a non-limiting embodiment of the present disclosure, the at least one sensor comprises a camera.

In accordance with the robotic system of the present disclosure, the reduced footprint design and efficient mechanical configuration of components make the robotic system compact and easily retrofittable. The robotic system described herein is adapted to access a larger range of distance using a horizontally and vertically articulating gantry structure compared to traditional assistive robots.

Also, in comparison to a typical robotic manipulator system or robotic arm where the base motor works against the maximum torque, even when the motion of the end effector is in a horizontal plane, the robotic system of the present disclosure divides the rotational motion in two axes, i.e., horizontal and vertical. In the robotic system of the present disclosure, the horizontal travel of the end effector eliminates the need of high power thereby a powerful base motor is not required. Also, the vertical gantry, due to a simplified counter-weight system, balances the dead weight of the robotic system, thereby eliminating the need of a high power for the vertical movement. Thus, the robotic system of the present disclosure requires low power and is cost effective.

Further, the dynamic conveyor associated with the robotic system of the present disclosure reduces the time and effort required for unloading/loading of the goods from the trucks or ocean containers.

The robotic system of the present disclosure provides more robust performance completing everyday tasks in warehouse and dockyard environments.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The novel features and characteristics of the present disclosure are set forth in the description. The present disclosure itself, however, as well as a preferred mode of use, further objectives, and advantages thereof, will best be understood by reference to the following description of an illustrative embodiment when read in conjunction with the accompanying drawings. One or more embodiments are now described, by way of example only, with reference to the accompanying drawings wherein like reference numerals represent like elements and in which.

Figure 1:
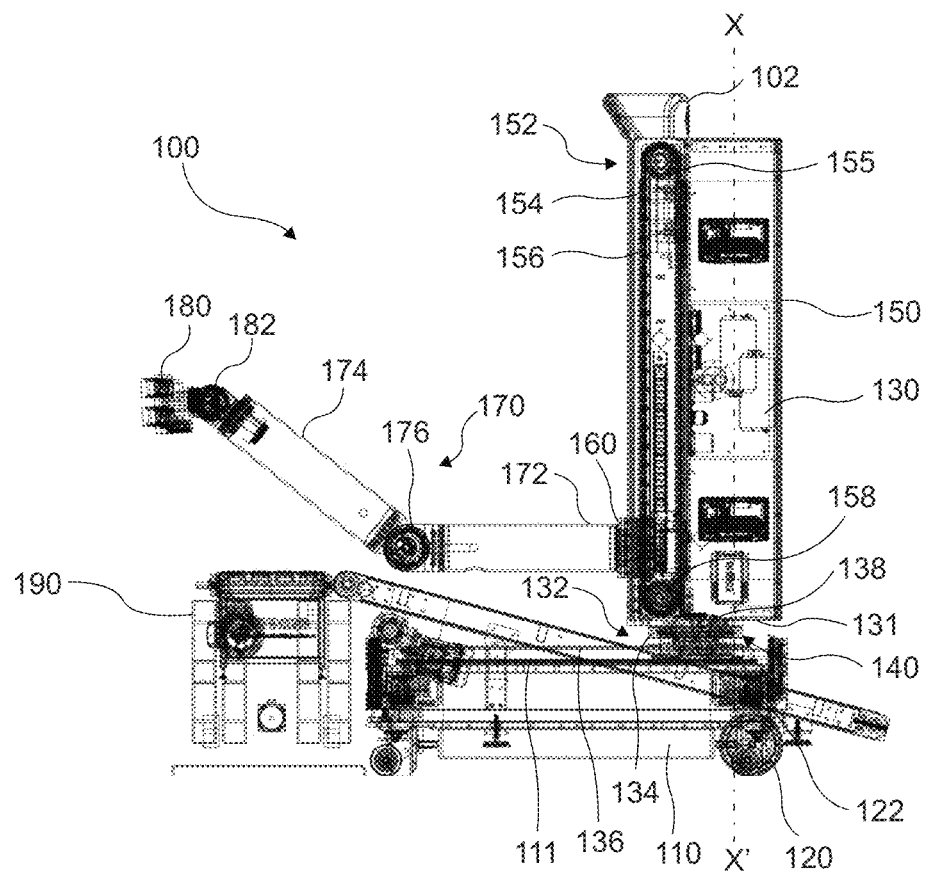
FIG. 1 is a side view of a mobile manipulation robotic system, in accordance with a first embodiment of the present disclosure.

Skilled artisans will appreciate that elements in the drawings are illustrated for simplicity and have not necessarily been drawn to scale. For example, the dimensions of some of the elements in the drawings may be exaggerated relative to other elements to help to improve understanding of embodiments of the present disclosure.

DETAILED DESCRIPTION

While the disclosure is susceptible to various modifications and alternative forms, specific embodiments thereof have been shown by way of example in the FIGS. and will be described in detail below. It should be understood, however that it is not intended to limit the disclosure to the particular forms disclosed, but on the contrary, the disclosure is to cover all modifications, equivalents, and alternatives falling within the scope of the disclosure as defined by the appended claims.

Before describing detailed embodiments, it may be observed that the novelty and inventive step that are in accordance with the present disclosure resides in a mobile manipulation robotic system. It is to be noted that a person skilled in the art can be motivated from the present disclosure and modify the various constructions of the mobile manipulation robotic system. However, such modification should be construed within the scope of the present disclosure. Accordingly, the drawings are showing only those specific details that are pertinent to understanding the embodiments of the present disclosure so as not to obscure the disclosure with details that will be readily apparent to those of ordinary skill in the art having benefit of the description herein.

In the present disclosure, the term "exemplary" is used herein to mean "serving as an example, instance, or illustration." Any embodiment or implementation of the present subject matter described herein as "exemplary" is not necessarily to be construed as preferred or advantageous over other embodiments.

The terms "comprises", "comprising", or any other variations thereof, are intended to cover a non-exclusive inclusions, such that a device that comprises a list of components does not include only those components but may include other components not expressly listed or inherent to such setup or device. In other words, one or more elements in a system or apparatus proceeded by "comprises . . . a" does not, without more constraints, preclude the existence of other elements or additional elements in the system or apparatus.

The terms like "at least one" and "one or more" may be used interchangeably or in combination throughout the description.

Pursuant to a first embodiment, a robotic system configured for performing a task of loading and unloading goods, is disclosed. The robotic system comprises a mobile base assembly, an actuation assembly coupled to the mobile base assembly and configured to move with respect to the base assembly, and a head assembly mounted atop the actuation assembly or the mobile base assembly. The head assembly comprises one or more sensors configured to collect data related to an operation environment and the task to be performed. The robotic system further comprises a dynamic conveyor coupled to the mobile base assembly. The dynamic conveyor comprises a platform. The robotic system furthermore comprises a control unit configured to move the platform to align the platform with respect to the goods to be loaded or unloaded. Further, the robotic system comprises a manipulation arm coupled to the actuation assembly or the dynamic conveyor and configured to move to perform the task. In an embodiment, the dynamic conveyor comprises a plurality of sensors and the control unit. The control unit is communicatively coupled to the plurality of sensors. The plurality of sensors is configured to collect data associated with a position of the goods in a container. Further, the control unit is configured to actuate, by an actuator, the platform to align the platform of the dynamic conveyor with respect to the goods, based on the data received from the plurality of sensors. The control unit is further communicatively coupled to sensors in at least one of the mobile base assembly, the actuation assembly, the head assembly, or the manipulation arm for receiving additional data related to the operation environment and the task. The control unit is configured to align the platform with respect to the goods, based on the data received from the sensors in at least one of the mobile base assembly, the actuation assembly, the head assembly, or the manipulation arm.

In an embodiment, the dynamic conveyor comprises a platform comprising sets of rollers provided at a first end and a second end of the platform, and a conveyor belt adapted to rotate over the sets of rollers for conveying the goods, and a hinge assembly provided at the first end of the platform. The hinge assembly is configured to facilitate a pivotal movement of the platform relative to the mobile base assembly. The dynamic conveyor further comprises at least one connecting link comprising a first end coupled to a lower surface of the platform of the dynamic conveyor, and a second end movable along a rail unit on the mobile base assembly. A movement of the second end of the connecting links causes the platform to be raised or lowered. In another embodiment, the dynamic conveyor comprises a scissors-type dynamic conveyor that comprises pairs of scissors-legs pivotally coupled to each other about scissors pivot axes. The scissors-type dynamic conveyor is adapted to extend and retract the pairs of scissors-legs along a vertical direction and a horizontal direction. The dynamic conveyor comprises a hydraulic actuator or an electrical actuator.

In an embodiment, the robotic system comprises a container containing the goods. The dynamic conveyor extends along a full width of the container and up to a full height of the container.

In an embodiment, the manipulation arm is configured to move linearly with respect to the dynamic conveyor. The manipulation arm comprises a plurality of arm links and a manipulation payload pivotably coupled to one another and controlled by at least one motor. The manipulation payload comprises a vacuum cup or a modular gripping tool. The manipulation payload is configured to receive different modular gripping tools for different types of the goods.

In an embodiment, the dynamic conveyor forms an integral unit with the mobile base assembly.

In an embodiment, the manipulation arm is coupled to a lift carriage of the actuation assembly. The lift carriage is adapted to move the manipulation arm along a vertical axis of the actuation assembly. The actuation assembly comprises a translation drive system comprising a drive chain housed within a chain cartridge and operated by a drive motor. The translation drive system is configured to move the lift carriage and the manipulation arm along the vertical axis of the actuation assembly. The actuation assembly is further adapted to move linearly, by a first translation drive system, over the mobile base assembly along a horizontal plane, and/or rotate, by a rotational drive system, over the mobile base assembly, about a longitudinal axis of the actuation assembly.

The first translation drive system comprises at least one upper guide affixed to a base plate of the actuation assembly, and at least one lower rail affixed to a top plate of the mobile base assembly. A first upper guide of the at least one upper guide is coupled to a corresponding lower rail to facilitate a linear movement of the actuation assembly with respect to the mobile base assembly. The first translation drive system comprises an actuator configured to move the at least one upper guide relative to the at least one lower rail to move the actuation assembly relative to the mobile base assembly.

In an embodiment, the rotational drive system comprises a bearing unit coupled to a base plate of the actuation assembly and a top plate of the mobile base assembly. The bearing unit comprises an outer race coupled to the top plate of the mobile base assembly, and an inner race coupled to the base plate of the actuation assembly. The inner race is rotatable with respect to the outer race in order to rotate the actuation assembly with respect to the mobile base assembly. The rotational drive system comprises a motor operatively coupled to the bearing unit and adapted to actuate rotation of the inner race with respect to the outer race.

Further, the mobile base assembly comprises a plurality of drive wheels. Each drive wheel is operable by a respective drive motor, to facilitate movement of the mobile base assembly. The drive motors are configured to operate in unison and independently of each other.

Pursuant to a second embodiment, a robotic system for handling objects is disclosed. The robotic system comprises a base, a manipulation arm mounted on the base and comprising at least two arm links pivotably coupled to one another, a vacuum unit at a distal end of the manipulation arm and configured to attach to a portion of the goods and a dynamic conveyor. The dynamic conveyer comprises a platform arranged adjacent to the base such that the manipulation arm is extendable over and across the platform, a motorized conveyer belt on the platform and configured to move goods placed on the motorized conveyer belt, and a motorized platform configured to be moved in a vertical direction. The robotic system further comprises at least one sensor configured to collect sensor data indicative of a first position of an object to be handled, and at least one control device. The at least one sensor comprises a camera. The at least one control device is configured to move the motorized platform up or down, based on the sensor data, to align the platform with the first position of the object, control the manipulation arm to attach to the object and move the object to or from the motorized conveyer belt while the platform is aligned with the first position of the object, and control the motorized conveyer belt to move the object. In an embodiment, the motorized conveyer belt is oriented horizontally.

In a further embodiment, the motorized conveyer belt is a first motorized conveyer belt, and the dynamic conveyer comprises an inclined motorized conveyer belt coupled to the first motorized conveyer belt and arranged downstream of the first motorized conveyer belt to receive the object moved by the first motorized conveyer belt. The inclined motorized conveyer belt, in a downstream direction, tilts downward from a vertical level of the first motorized conveyer belt. Further, the first motorized conveyer belt extends along a first side of the base, and the inclined motorized conveyer belt extends along a second side of the base. The second side is adjacent to the first side.

The first motorized conveyer belt and the inclined motorized conveyer belt are coupled via a platform having a rectangular top surface. The first motorized conveyer belt and the inclined motorized conveyer belt are driven by separate motors.

The motorized mechanism comprises a pair of scissor legs pivotally coupled about a pivot axis, and pivoting of the pair of scissor legs about the pivot axis causes vertical movement of the platform. The motorized mechanism is hydraulically-driven or electrically-driven.

Reference will now be made to the exemplary embodiments of the disclosure, as illustrated in the accompanying drawings. Wherever possible, same numerals will be used to refer to the same or like parts. Embodiments of the present disclosure are described in the following paragraphs with reference to FIGS. 1 to 6. In FIGS. 1 to 6, the same element or elements which have same functions are indicated by the same reference signs.

Figure 2:
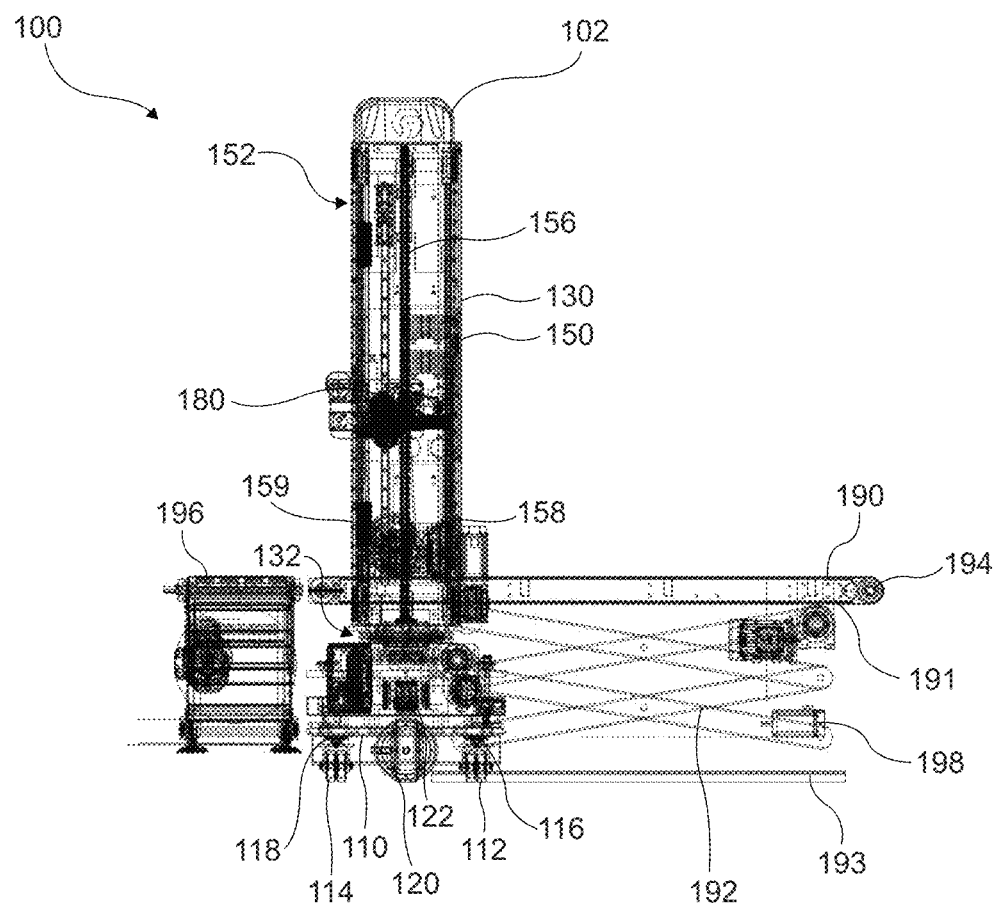
FIG. 2 is a front view of the mobile manipulation robotic system of FIG. 1, in accordance with an embodiment of the present disclosure.

FIGS. 1 and 2 illustrate an exemplary embodiment of a mobile manipulation robotic system (100) (hereinafter referred to as "the robotic system (100)") as described herein. The robotic system (100) comprises a mobile base assembly (110) and an actuation assembly (130) movable with respect to the mobile base assembly (110). The mobile base assembly (110) may be configured to move the robotic system (100) with respect to a surface, for example, the ground surface, on which the robotic system (100) is located. The mobile base assembly (110) may enable the robotic system (100) to be placed in proximity of an object or environment associated with a task to be performed by the robotic system (100). For example, the mobile base assembly (110) may cause the robotic system (100) to move across a warehouse or a dockyard to access an ocean container or a truck containing the goods/samples to be unloaded or loaded.

In an embodiment, the mobile base assembly (110) may include drive wheels, for example, a first drive wheel (112) and a second drive wheel (114). The first drive wheel (112) may be coupled to a first drive motor (116) and the second drive wheel (114) may be coupled to a second drive motor (118). The first drive motor (116) and the second drive motor (118) may, respectively, drive the first drive wheel (112) and the second drive wheel (114) in order to move the mobile base assembly (110) in a forward direction, a backward direction, as well as to turn the mobile base assembly (110) in a clockwise or counterclockwise motion parallel to the surface on which the mobile base assembly (110) is located. In some embodiments, the first drive motor (116) and the second drive motor (118) may operate in unison. In some embodiments, the first drive motor (116) and the second drive motor (118) can operate independently of one another. In a few embodiments, the first drive motor (116) and/or the second drive motor (118) may be coupled, respectively, to the first drive wheel (112) and/or the second drive wheel (114) via a differential transmission. In an embodiment, the mobile base assembly (110) may comprise holonomic motion mechanism having one or more holonomic wheels (120), for example Mecanum wheels, each of which is adapted to be driven by an independently controlled motor (122), for example, a swerve motor (122). The holonomic motion mechanism may be contemplated as one that is not subject to motion constraints. Without deviating from the scope of the present disclosure, the mobile base assembly (110) is considered to be holonomic if the controllable degrees of freedom are equal to the total degrees of freedom. Said mobile base assembly (110) may translate in any direction while simultaneously rotating. This is different than most types of ground vehicles, such as car-like vehicles, tracked vehicles, or wheeled differential-steer (skid-steer) vehicles, which cannot translate in any direction while rotating at the same time. In an embodiment, the mobile base assembly (110) is configured to be driven on a levelled surface. In another embodiment, the mobile base assembly (110) is configured to be driven on an unlevelled surface.

In accordance with the present disclosure, the mobile base assembly (110) may comprise a battery and a computing device (not shown) mounted on a base platform. The battery may provide power to the computing device and any of the drive motors (116, 118) and/or swerve motor (122) and sensors of the robotic system (100). In some embodiments, the battery may include one or more batteries or one or more battery packs to allow better distribution of mass across the mobile base assembly (110). In some embodiments, the battery may include a sealed lead acid battery or a Lithium-ion battery or Lithium Iron Phosphate battery. The computing device may include a processor, a memory, a communication interface, and one or more I/O interfaces. The memory can store computer-readable and executable instructions, which when executed by the processor causes the robotic system (100) to operate in an autonomous or semi-autonomous manner in regard to a particular task or in regard to sensor data received by the processor from one or more sensors of the robotic system (100).

Further, the mobile base assembly (110) may comprise sensors including, but not limited to, a laser rangefinder, a camera, or a sonar sensor. The laser rangefinder can spin to collect sensor data associated with a two-dimensional (2D) depth map of an environment, for example, the dockyard, warehouse, ocean container or truck, in which the robotic system (100) is operating. The design of the mobile base assembly (110) allows the laser rangefinder to collect sensor data over a wide field of view.

The robotic system (100) may further comprise the actuation assembly (130) configured to move relative to the mobile base assembly (110). The actuation assembly (130) may comprise a longitudinal axis (X-X') or a vertical axis that is perpendicular to the horizontal plane of the mobile base assembly (110). The actuation assembly (130) may be configured to translate horizontally over the mobile base assembly (110) along the horizontal plane of the mobile base assembly (110), in the forward and backward directions. Further, the actuation assembly (130) may be configured to rotate over the mobile base assembly (110) about the longitudinal axis (X-X') of the actuation assembly (130), in clockwise or counterclockwise directions. In an embodiment, the actuation assembly (130) may comprise a vertical gantry structure (150) configured to deploy a plurality of segments to reach, retrieve, or otherwise access the object, for example the goods/samples contained in the ocean container or truck or pallet or conveyor, for unloading and loading purposes.

In accordance with the present disclosure, the robotic system (100) comprises a first translation drive system (132) for movably coupling the actuation assembly (130) with the mobile base assembly (110). The first translation drive system (132) may be adapted to move the actuation assembly (130) over the mobile base assembly (110) along the horizontal plane of the mobile base assembly (110) in the forward and backward directions. The first translation drive system (132) may comprise at least one upper guide (134) affixed to a base plate (131) of the actuation assembly (130). In some implementations, the guide 134, or other guides discussed herein, can be or include a rail. The upper guide (134) may include a first stop. The first translation drive system (132) may further comprise at least one lower rail (136) affixed to a top plate (111) of the mobile base assembly (110). The lower rail (136) may include a second stop. Within the scope of the present disclosure, the at least one upper guide (134) may be operatively coupled to the corresponding lower rail (136) in order to enable movement of the actuation assembly (130) with respect to the mobile base assembly (110). The first translation drive system (132) may further comprise a linear actuator (138) attached to the actuation assembly (130). Upon actuation of the linear actuator (138), the actuation assembly (130) is translated in either a first direction or a second direction opposite the first direction relative to the mobile base assembly (110). In an embodiment, the first direction may correspond to the forward direction and the second direction may correspond to the backward direction along the horizontal plane of the mobile base assembly (110). In one exemplary embodiment, the linear actuator (138) may include a ball screw that threadably engages a ball screw nut attached to the actuation assembly (130). In another embodiment, the linear actuator (138) may include a motor (138), for example a stepper motor.

Further, the robotic system (100) may comprise a rotational drive system (140) provided between the base plate (131) of the actuation assembly (130) and the top plate (111) of the mobile base assembly (110). The rotational drive system (140) is adapted to rotate the actuation assembly (130) over the mobile base assembly (110) about the longitudinal axis (X-X') of the actuation assembly (130). In an embodiment, the rotational drive system (140) comprises a bearing unit operatively coupled to the base plate (131) of the actuation assembly (130) and the top plate (111) of the mobile base assembly (110). The bearing unit may comprise an outer race and an inner race rotatably coupled with the outer race. The outer race is coupled to the top plate (111) of the mobile base assembly (110) and the inner race is coupled to the base plate (131) of the actuation assembly (130), such that the inner race is rotatable with respect to the outer race in order to rotate the actuation assembly (130) with respect to the mobile base assembly (110). The rotational drive system (140) further comprises a motor operatively coupled to the bearing unit and adapted to actuate the inner race to rotate with respect to the outer race. Upon rotation of the inner race with respect to the outer race, the actuation assembly (130) rotates, about the longitudinal axis (X-X') of the actuation assembly (130), with respect to the mobile base assembly (110).

In an embodiment, the actuation assembly (130) further comprises a second translation drive system (152) housed within the vertical gantry structure (150). The second translation drive system (152) may be adapted to move a lift carriage (160) formed of the plurality of segments to reach, retrieve, or otherwise access the object, for example the goods/samples contained in the ocean container or truck or pallet or conveyor, along the longitudinal axis (X-X') of the actuation assembly (130). The second translation drive system (152) may comprise a chain cartridge (154) including a drive chain (156) therein. The chain cartridge (154) may be a self-spooling chain cartridge and may comprise a passively rotating pinion (155) configured to receive a proximal end of the drive chain (156). The self-guided chain cartridge (154) may include one or more curved guide tracks (not shown) formed on an internal surface of the self-guided chain cartridge (154). In another embodiment, the chain cartridge (154) may be a guided cartridge including one or more spiral shaped tracks (not shown) for the drive chain (156) to slide into. The spiral shaped tracks can include a smooth surface formed from spring steel or plastic. In said embodiment, the proximal end of the drive chain (156) may not be affixed to the chain cartridge (154) and is free to travel within the spiral shaped tracks during extension or retraction of the drive chain (156) relative to the chain cartridge (154).

The drive chain (156) may be engageably coupled to a drive mechanism of a chain motor (158) of the actuation assembly. The drive chain (156) may include one or more interconnected links and is driven by the chain motor (158) for movement along the longitudinal axis (X-X') of the actuation assembly (130). In accordance with the present disclosure, one end of the drive chain (156) is coupled to the lift carriage (160) such that the movement of the drive chain (156) along the longitudinal axis (X-X') of the actuation assembly (130) causes a movement of the lift carriage (160) along the longitudinal axis (X-X') of the actuation assembly (130), in the upward and downward directions.

In operation, the drive chain (156) is withdrawn from within the chain cartridge (154) as the chain motor (158) actuates in the first direction imparting a linear translation force on the lift carriage (160) of the actuation assembly (130) causing the lift carriage (160) to ascend along the longitudinal axis (X-X') of the actuation assembly (130). The drive chain (156) is passively withdrawn from within the chain cartridge (154) as the lift carriage (160) ascends. Conversely, the drive chain (156) is pushed into the chain cartridge (154) as the lift carriage (160) descends along the longitudinal axis (X-X') of the actuation assembly (130). The curved guide tracks can act with rotation of the pinion (155) in response to the chain motor (158) imparting the linear translation force on the lift carriage (160) to cause the lift carriage (160) to ascend or descend.

Further, the other end of the drive chain (156) is coupled to a counter weight (159) such that said end of the drive chain (156) experiences a downward force due to action of gravity on the counter weight (159). Accordingly, it can be contemplated that in a case where the chain motor (158) drives the drive chain (156) to move the lift carriage (160) in the upward direction, a part of the energy/power/torque for said movement is compensated/balanced by the downward force due to action of gravity on the counter weight (159), thereby eliminating the need of a high power for the vertical movement of the lift carriage (160).

Further, the robotic system (100) may comprise ahead assembly (102) mounted atop the actuation assembly (130). The head assembly (102) may comprise one or more sensors configured to collect sensor data with respect to an operational environment in which the robotic system (100) is located. For example, the head assembly (102) may collect sensor data associated with visual data of the samples/goods contained in the ocean container or the truck for which the robotic system (100) can be programmed (for unloading or loading of the container/truck). The head assembly (102) may be mounted atop the actuation assembly (130) via a plate. The head assembly (102) may be configured in an elevated configuration relative to the mobile base assembly (110), which may be critical for environment-robot interaction, avoiding obstacles during navigation, and providing a downward-view during object manipulation or environment-robot interaction.

The head assembly (102) may include a sensor and a collection of peripheral devices or sensors, which may collectively represent a first collection of sensors. Sensors may include a depth finder, a camera, or a laser rangefinder. The collection of peripheral devices may also include a depth finder, a camera, or a laser rangefinder. By co-locating visual sensors, auditory sensors, and feedback devices, such as speakers, in the head assembly, a more robust autonomous experience is provided by directing verbal commands to the head assembly (102). The collection of sensors may collect sensor data associated with an operational environment in which the robotic system (100) is located, as well as specific objects within the operational environment that may be associated with a task being performed by the robotic system (100). The sensor may be supported by a support structure that may support or position the sensor in an inferior position relative to the support structure and the remainder of the head assembly (102). This inferior or underhung position can be advantageous to allow the sensor to articulate and provide a downward view of an object or environment without occlusion from other portions of the head assembly (102). The inferior or underhung configuration can also beneficially protect the sensor from damage during handling and/or shipping.

In an embodiment, the actuation assembly (130) may include at least one manipulation arm (170). For example, the exemplary embodiment of FIGS. 1 and 2 illustrates one manipulation arm (170). The manipulation arm (170) may be coupled to the lift carriage (160) such that the movement of the lift carriage (160) along the longitudinal axis (X-X') of the actuation assembly (130) effects a movement of the manipulation arm (170) along the longitudinal axis (X-X') of the actuation assembly (130). The manipulation arm (170) is configured to reach, retrieve, or otherwise access the object, for example the goods/samples contained in the ocean container or truck or pallet or conveyor, for unloading and loading purposes. In an exemplary embodiment, the manipulation arm (170) comprises two arm links, namely a first arm link (172) and a second arm link (174), and a manipulation payload or an end effector (180) coupled to the arm links (172, 174), as shown in FIG. 1. In accordance with the present disclosure, the first arm link (172) may be rigidly coupled to the lift carriage (160) of the actuation assembly (130) such that the movement of the lift carriage (160) effects the movement of the first arm link (172) along the longitudinal axis (X-X') of the actuation assembly (130) in the upward or downward direction. Further, the second arm link (174) may be pivotably coupled to the first arm link (172). In an embodiment, the second arm link (174) may be pivotable with respect to the first arm link (172) about an axis that is perpendicular to the plane containing the longitudinal axis of the first arm link (172) and the longitudinal axis (X-X') of the actuation assembly (130). Further, the manipulation arm (170) may comprise an actuator (176), for example a motor, operatively coupled with the second arm link (174) in order to effect pivotal movement of the second arm link (174) with respect to the first arm link (172).

Further, as shown in FIG. 1, the manipulation payload (180) is coupled to the second arm link (174) at an end opposite to the first arm link (172). The manipulation payload (180) may include inter-changeable tools, actuators, and/or sensors. The manipulation payload (180) may comprise modular gripping tools or vacuum cups for grasping, holding and delivering the goods/samples for unloading or loading the goods from the ocean container or trucks or pallet or conveyor. The modular gripping tools may be changed according to a type of the goods contained in the container. The manipulation payload (180) may include a plurality of payload motors (182), for example three payload motors, and a payload drive mechanism. The payload drive mechanism may be actuated by the payload motors (182) and may actuate the manipulation tool/payload (180) or other inter-changeable device, which can be coupled to the payload drive mechanism. In an embodiment, the manipulation payload (180), the payload motors (182), and the payload drive mechanism can be configured in an offset configuration relative to the distal segment of the second arm link (174). The payload drive mechanism may provide rotational and translation degrees of freedom that are oriented parallel, perpendicular, inclined and/or rotatable to the surface on which the robotic system (100) is located. As such, the payload drive mechanism may advantageously enable the manipulation tool/payload (180) or other inter-changeable device coupled to the payload drive mechanism to be rotated out of a footprint of the mobile base assembly (110) during manipulation and then retracted back within the footprint during navigation or when stowed. In addition, the offset configuration of the manipulation payload (180) may make the components of the manipulation payload more visible to the sensor in the head assembly (102). In this way, the vertical gantry structure (150) will not obscure views of the manipulation payload (180) during localization, object detection, or navigation by the robotic system (100).

The manipulation payload (180) may actuate in a yaw motion that may be achieved through actuation of a first motor of the payload motors (182) to cause the payload drive mechanism to rotate. The manipulation payload (180) may also actuate in a pitch motion that may be achieved through actuation of a second motor of the payload motors (182). The manipulation payload (180) may further actuate in a roll motion that may be achieved through actuation of a third motor of the payload motors (182). In some embodiments, the manipulation payload (180) may actuate in multiple degrees of freedom, such as a roll-pitch-roll motion, or a roll-pitch-yaw motion. Such complex movements can be achieved by sequential or concurrent actuation of the payload motors (182) for yaw motions, pitch motions, and roll motions.

Furthermore, the robotic system (100) may include a computing device (not shown) comprising a data processor and a memory storing non-transitory computer-readable instructions which can be executed by the data processor. The computing device may also include one or more controllers and a communication interface. The computing device may be coupled to a power supply located in the mobile base assembly (110), such as the battery. The power supply may be coupled to one or more sensors and to one or more actuators. The one or more sensors may transmit sensor data to the computing device. The actuators may include the first drive motor (116), the second drive motor (118), the swerve motor (122), the stepper motor/linear actuator (138), the chain motor (158), the actuator (176) and the payload motors (182). The first drive motor (116), the second drive motor (118), the swerve motor (122), the stepper motor/linear actuator (138), the chain motor (158), the actuator (176) and the payload motors (182) may be coupled to the computing device and may receive control commands from the computing device. Each of the first drive motor (116), the second drive motor (118), the swerve motor (122), the stepper motor/linear actuator (138), the chain motor (158), the actuator (176) and the payload motors (182) may be configured with a low gear ratio and coupled to a corresponding controller of the controllers. Each motor can be individually controlled via the corresponding controller to actuate according to a control command provided from the computing device. The one or more controllers may include a current controller, a force controller, and/or a position controller. The current controller can be configured to generate actuation signals in response to input signals received from the force controller. The actuation signals can be provided to the first drive motor (116), the second drive motor (118), the swerve motor (122), the stepper motor/linear actuator (138), the chain motor (158), the actuator (176) and the payload motors (182). The force controller can receive inputs associated with a measured interaction force (Fi), a maximum interaction force (Fm), and a desired/objective output force (Fo). The position controller can be configured to output the desired or objective output force (Fo) based on inputs of measured and desired/objective position/location data associated with a position/location of the vertical gantry structure and/or the mobile base assembly.

The first drive motor (116), the second drive motor (118), the swerve motor (122), the stepper motor/linear actuator (138), the chain motor (158), the actuator (176) and the payload motors (182) may include closed loop current feedback control for actuation of the first and second drive wheels (112, 114) and holonomic wheels (120) in the mobile base assembly (110), the linear actuator (138) for the first translation drive system (132), the chain motor (158) for the second translation drive system (152) and the lift carriage (160), and the actuator (176) and the payload motors (182) for the manipulation arm (170). Stepper motors can be configured to generate high torque at low speeds, allowing lower gear ratio transmissions or gear trains to be used. The robotic system (100) may control coil current of the first drive motor (116), the second drive motor (118), the swerve motor (122), the stepper motor/linear actuator (138), the chain motor (158), the actuator (176) and the payload motors (182) based on feedback associated with a rotor position of the corresponding motor. The rotor position can be measured via a Hall effect sensor and a magnet mounted to the motor. The closed loop current feedback control allows instantaneous actuator current to be determined. In some embodiments, the closed loop current feedback control can be implemented by a position and/or velocity control loop of the motor using a proportional-integral-derivative (PID) control loop mechanism.

In an embodiment, the computing device may be coupled to a second computing device via a network. The second computing device may be located remotely from the robotic system (100). In some embodiments, the robotic system (100) may include the second computing device that may comprise a data processor, a memory storing non-transitory computer-readable instructions, a communication interface, an input device and a display including a graphical user interface. The second computing device may be configured to receive user inputs and to generate control commands to control the robotic system (100) to perform a task, to navigate an environment, or to transmit sensor data to the second computing device. The second computing device may receive the user input via the input device and/or the GUI. The user inputs can be processed and transmitted via the communication interface to the communication interface of the first computing device. In some embodiments, the communication interfaces may be wired communication interfaces or wireless communication interfaces. Once received, the robotic system (100) may be configured to generate an actuation signal responsive to the user input causing the robotic system (100) to actuate. In some embodiments, the input device may include a joystick, a keyboard, a mouse, or a touchscreen.

The reduced footprint design and efficient mechanical configuration of the components make the robotic system (100) compact, and easily retrofittable. In fact, compared to the traditional assistive robotic systems, an increased number of robotic systems (100), for example, two or three robotic systems (100), may enter into the ocean container of the same size and work/coordinate synchronously for unloading or loading of the goods/samples from the ocean container or trucks or pallet or conveyors.

Further, the robotic system (100) described herein is adapted to access a larger range of distance using a horizontally and vertically articulating gantry structure compared to traditional robotic arms or manipulation systems.

Also, due to individual motor, for example, first drive motor (116), the second drive motor (118), the swerve motor (122), the stepper motor/linear actuator (138), the chain motor (158), the actuator (176) and the payload motors (182), provided for each motion point/part/joint, a large sized motor for driving the entire robotic system is not required. In fact, total energy (torque) requirement for all first drive motor (116), the second drive motor (118), the swerve motor (122), the stepper motor/linear actuator (138), the chain motor (158), the actuator (176) and the payload motors (182) of the mobile manipulation robotic system (100) of the present disclosure is less than the energy (torque) required in the traditional robotic systems or robotic arms.

In accordance with a further aspect of the present disclosure, referring to FIGS. 1 to 4, the robotic system (100) may comprise a dynamic conveyor (190) associated with the mobile base assembly (110) of the robotic system (100). In accordance with the present disclosure, the dynamic conveyor (190) may be formed integrally with the robotic system (100) and/or with the mobile base assembly (110) of the robotic system (100). The dynamic conveyor (190) may be adapted to self-align a platform (191) of the dynamic conveyor (190) with respect to the manipulation payload (180) and/or the goods/sample to be unloaded from/loaded on the ocean container/truck, thereby reducing the time and effort for unloading or loading of the goods/samples from the ocean container or truck or pallet or conveyors.

Within the scope of the present disclosure, the dynamic conveyor (190) may comprise a plurality of sensors and control unit for aligning the platform (191) of the dynamic conveyor (190) with respect to the manipulation payload (180) and/or the goods/sample to be unloaded/loaded from the ocean container/truck/pallet or conveyor. The plurality of sensors includes, but not limited to, a laser rangefinder, a camera, or a sonar sensor. The plurality of sensors may be configured to collect sensor data associated with a height and/or depth of the manipulation payload (180) and/or the goods/sample to be unloaded/loaded from the ocean container/truck/pallet or conveyor. Further, the control unit may be communicatively coupled with the plurality of the sensors of the dynamic conveyor (190) for receiving the sensed data therefrom, and actuate, via an actuator, the 'scissor-type' dynamic conveyor (190) for aligning the platform (191) of the dynamic conveyor (190) with respect to the manipulation payload (180) and/or the goods/sample to be unloaded from the ocean container/truck. In an embodiment, the control unit may further be communicatively coupled with the sensors of the mobile base assembly (110), the actuation assembly (130), the head assembly (102), the vertical gantry structure (150) and the lift carriage (160) for receiving the sensor data therefrom, and actuate, via the actuator, the 'scissor-type' dynamic conveyor (190) for aligning the platform (191) of the dynamic conveyor (190) with respect to the manipulation payload (180) and/or the goods/samples to be unloaded/loaded from the ocean container/truck/pallet or conveyor.

Figure 3:
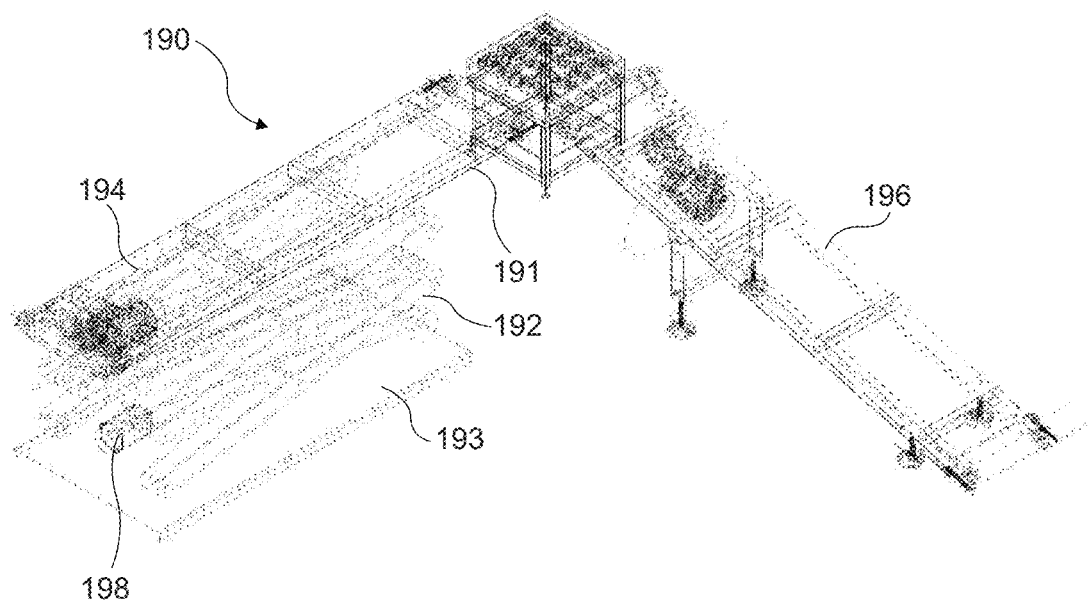
FIG. 3 is a top perspective view of a dynamic conveyor of the mobile manipulation robotic system of FIG. 1, in accordance with an embodiment of the present disclosure.

FIGS. 1 to 3 illustrate a 'scissors-type' electrically or hydraulically-driven dynamic conveyor (190) including a plurality of scissors legs (192) (in pairs), the highest ones of which are mounted at a first end, e.g., using pivots, to the platform (191) and the lowest ones of which are mounted to the lower frame (193), via rollers. The scissors legs (192) are pivotally coupled, defining a scissors pivot axis. A drive or motive device or the actuator (198), such as a hydraulic cylinder, which may be powered by an electric or air driven pump may be coupled with the scissors legs (192) for moving the platform (191) in the vertical direction, by way of extending and retracting the scissors legs (192). In an embodiment, the hydraulic cylinder (198) may be pivotally coupled at one end to a first cross beam. The hydraulic cylinder may be activated to retract the rod, and the retraction causes the portion of one of each pair of legs (192) to be drawn upward or downward, of the other of each pair or legs (192). This causes the legs (192) to pivot about the axis, in a scissors-like fashion, thus raising or lowering the platform (191) of the dynamic conveyor (190). In an embodiment, the platform (191) of the dynamic conveyor (190) is a motorized platform (191).

Figure 4:
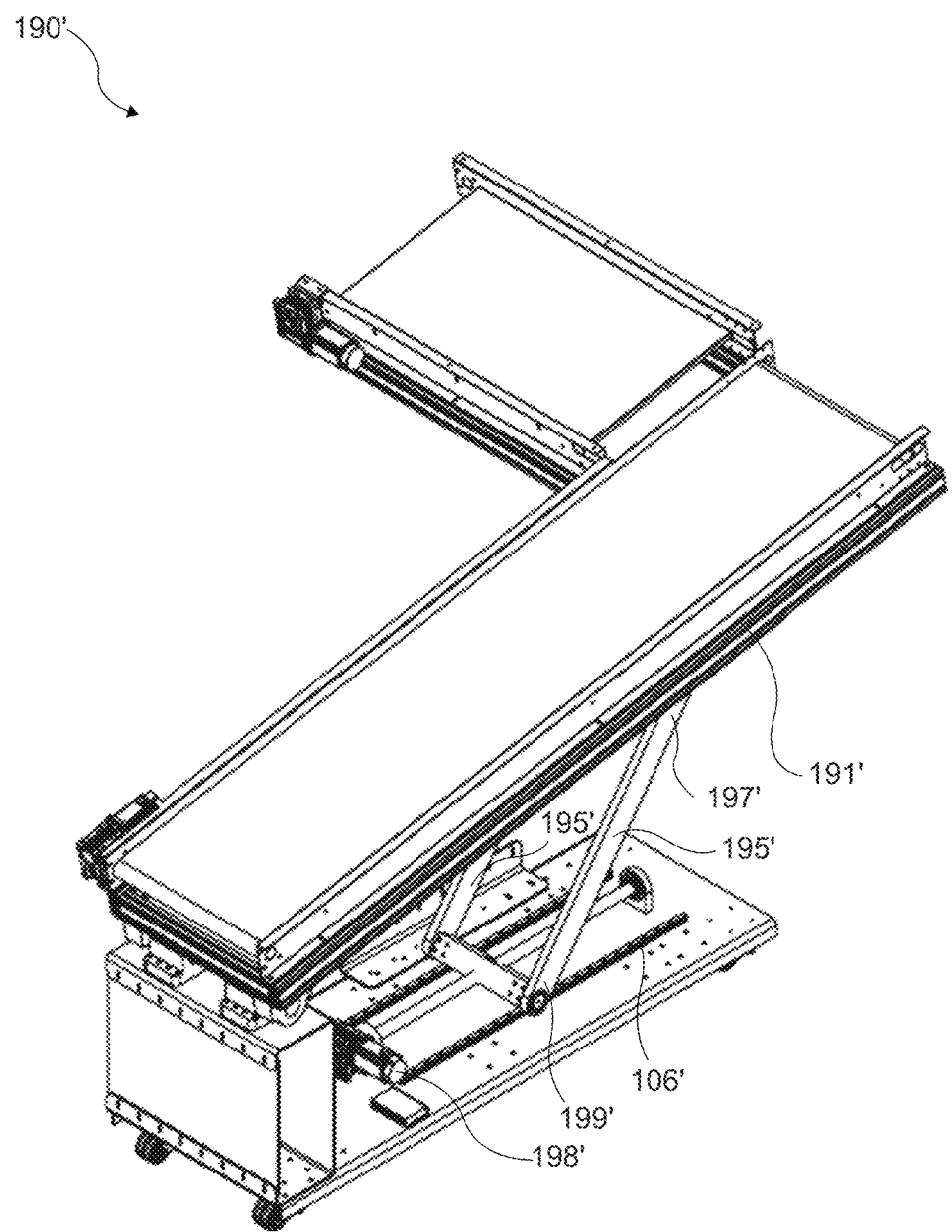
FIG. 4 is a top perspective view of the dynamic conveyor of the mobile manipulation robotic system of FIG. 1, in accordance with another embodiment of the present disclosure.

FIG. 4 illustrates a perspective view of a dynamic conveyor (190') in accordance with another embodiment of the robotic system (100). The dynamic conveyor (190') may comprise at least one connecting link (195'). One end/a first end (197') of the connecting link (195') may be coupled to a lower plate of the dynamic conveyor (190') and the other end/a second end (199') of the connecting link (195') may be movable along a rail unit (106') provided on the lower plate of the dynamic conveyor (190') to raise or lower a platform (191') of the dynamic conveyor (190'). The second end (199') of the connecting link (195') may be adapted to move along the rail unit (106') upon actuation of an actuator (198'), for example, a motor (198'), for raising or lowering the platform (191') of the dynamic conveyor (190') in order to align the platform (191') with respect to the goods/sample to be unloaded from the ocean container/truck. Within the scope of the present disclosure, the dynamic conveyor (190') may be adapted to extend along and upto a height and a width of the container. Further, the dynamic conveyor (190') may comprise a hydraulic actuator or an electrical actuator for controlling an operation or a position thereof.

In operation, upon receiving the sensed data from the plurality of sensors of the dynamic conveyor (190, 190') and/or from the sensors of the mobile base assembly (110), the actuation assembly (130), the head assembly (102), the vertical gantry structure (150) and the lift carriage (160), the control unit of the dynamic conveyor (190, 190') actuates the hydraulic cylinder for vertically moving the platform (191, 191') and aligning the platform (191, 191') of the dynamic conveyor (190, 190') with respect to the manipulation payload (180) and/or the goods/sample to be unloaded/loaded from the ocean container/truck/pallet or conveyor.

Further, the dynamic conveyor (190) (or the dynamic conveyor (190')) may comprise a horizontal conveyor belt (194), as shown in FIG. 3, coupled to the platform (191) so as to transfer the samples/boxes unloaded from the ocean container. The horizontal conveyor belt (194) may be driven by a first motor. In an embodiment, the horizontal conveyor belt (194) is a motorized conveyor belt (194). Further, as illustrated in FIG. 3, the dynamic conveyor (190) may comprise an inclined conveyor belt (196) disposed downstream of the horizontal conveyor belt (194) and coupled to the horizontal conveyor belt (194) for further transferring the samples/boxes unloaded from the ocean container. The inclined conveyor belt (196) may be driven by a second motor. In an embodiment, the inclined conveyor belt (196) is a motorized conveyor belt (196). Additionally, the dynamic conveyor (190) may comprise further conveyor belts (not shown) for further transfer of samples/boxes unloaded or loaded from the ocean container or truck or pallet or conveyor towards the warehouse/dockyard. In an embodiment of the present disclosure, the horizontal conveyer belt (194) and the inclined conveyer belt (196) are coupled via a platform having a rectangular top surface that may comprise a conveyor mechanism, conveyor belt or sets of rollers and facilitate transfer of goods from the horizontal conveyor belt (194) to the inclined conveyor belt (196) of the dynamic conveyor (190).

In accordance with the present disclosure, the dynamic conveyor (190) associated with the mobile manipulation robotic system (100) of the present disclosure reduces the time and effort required for unloading or loading of the goods/samples from the trucks or ocean containers or pallet or conveyor, compared to the robotic systems/arms.

Figure 5:
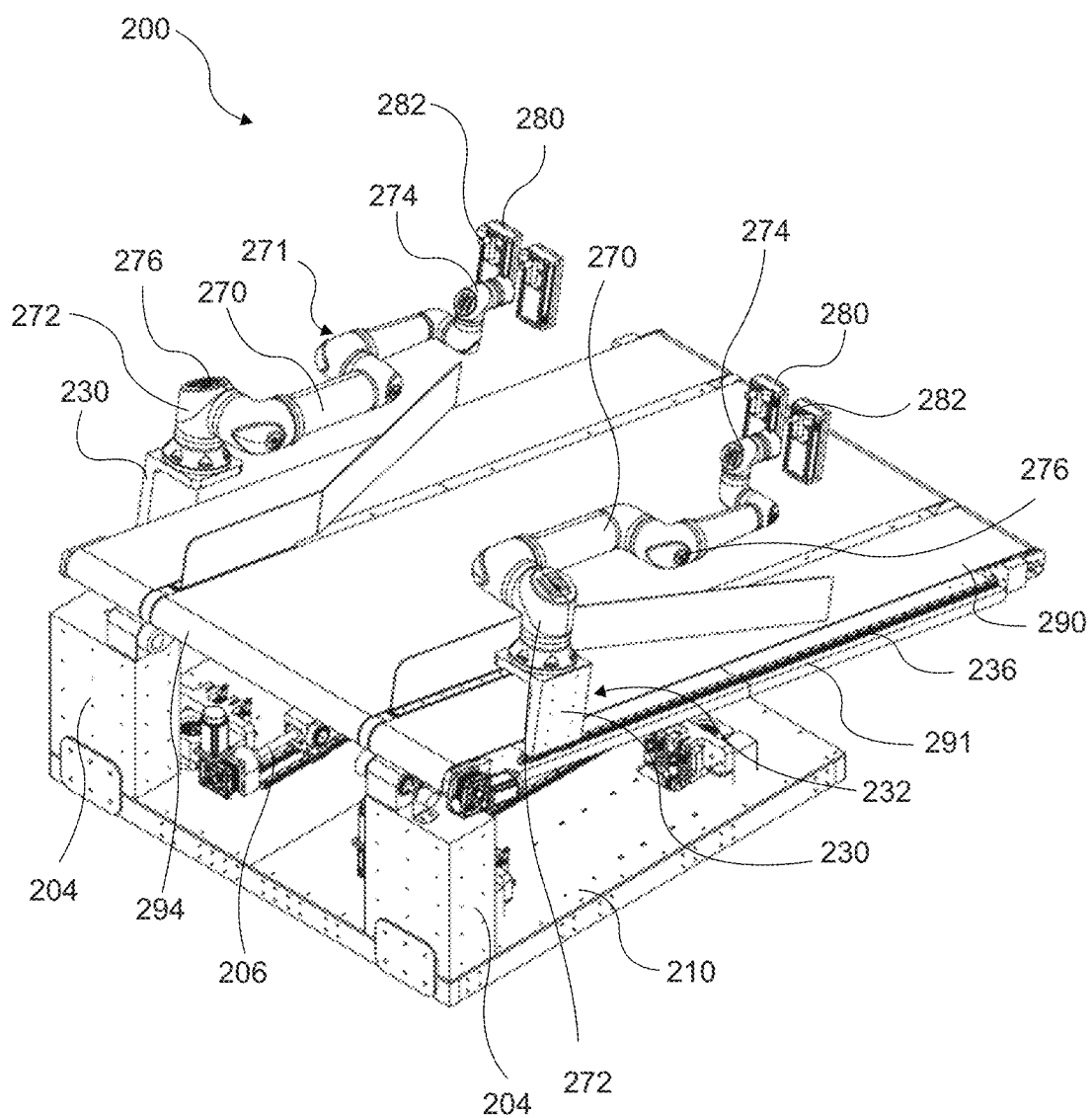
FIG. 5 is a perspective view of a mobile manipulation robotic system, in accordance with a second embodiment of the present disclosure.
Figure 6:
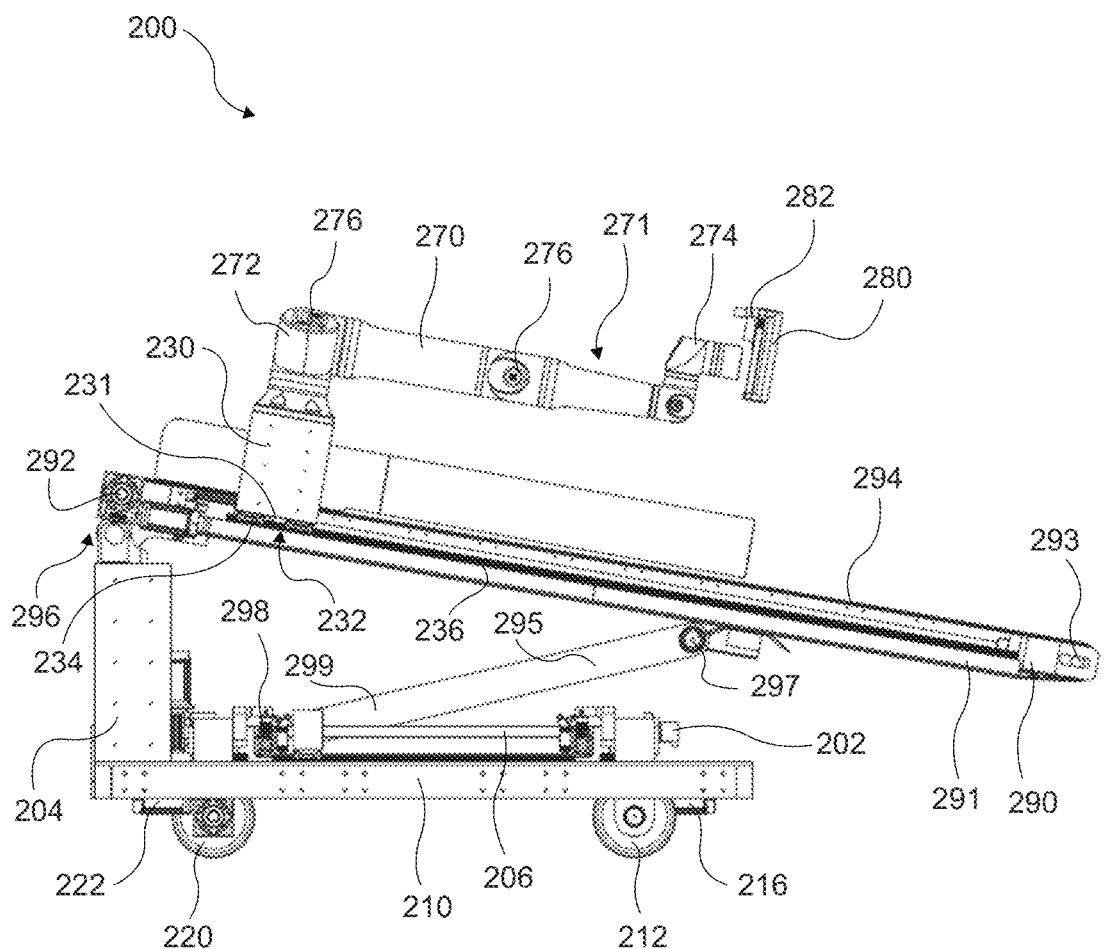
FIG. 6 is a front view of the mobile manipulation robotic system of FIG. 5, in accordance with an embodiment of the present disclosure.

FIGS. 5 and 6 illustrate an exemplary mobile manipulation robotic system (200) (hereinafter referred to as "the robotic system (200)") according to a second embodiment of the present disclosure. The robotic system (200) comprises a mobile base assembly (210) and a dynamic conveyor (290) that is integrally formed with the mobile base assembly (210). The robotic system (200) further comprises an actuation assembly (230) movable with respect to the mobile base assembly (210) and the dynamic conveyor (290). The mobile base assembly (210) may be configured to move the robotic system (200) with respect to a surface, for example, the ground surface, on which the robotic system (200) is located. The mobile base assembly (210) may enable the robotic system (200) to be placed in proximity of an object or environment associated with a task to be performed by the robotic system (200). For example, the mobile base assembly (210) may cause the robotic system (200) to move across a warehouse or a dockyard to access an ocean container or a truck containing the goods/samples to be unloaded or loaded.

In an embodiment, as shown in FIG. 6, the mobile base assembly (210) may include drive wheels, for example, a set of first drive wheels (212) and a set of second drive wheels (not shown). The first drive wheels (212) may be coupled to a first drive motor (216) and the second drive wheels may be coupled to a second drive motor. The first drive motor (216) and the second drive motor may, respectively, drive the first drive wheels (212) and the second drive wheels in order to move the mobile base assembly (210) in a forward direction, a backward direction, as well as to turn the mobile base assembly (210) in a clockwise or counterclockwise motion parallel to the surface on which the mobile base assembly (210) is located. In some embodiments, the first drive motor (216) and the second drive motor may operate in unison. In some embodiments, the first drive motor (216) and the second drive motor can operate independently of one another. In a few embodiments, the first drive motor (216) and/or the second drive motor may be coupled, respectively, to the first drive wheels (212) and/or the second drive wheels via a differential transmission. In an embodiment, the mobile base assembly (210) may comprise holonomic motion mechanism having one or more holonomic wheels (220), for example Mecanum wheels, each of which is adapted to be driven by an independently controlled motor (222), for example, a swerve motor (222). The holonomic motion mechanism may be contemplated as one that is not subject to motion constraints. Without deviating from the scope of the present disclosure, the mobile base assembly (210) is considered to be holonomic if the controllable degrees of freedom are equal to the total degrees of freedom. Said mobile base assembly (210) may translate in any direction while simultaneously rotating. This is different than most types of ground vehicles, such as car-like vehicles, tracked vehicles, or wheeled differential-steer (skid-steer) vehicles, which cannot translate in any direction while rotating at the same time. In an embodiment, the mobile base assembly (210) is configured to be driven on a levelled surface. In another embodiment, the mobile base assembly (210) is configured to be driven on an unlevelled surface.

In accordance with the present disclosure, the mobile base assembly (210) may comprise a battery and a computing device (not shown) mounted on a base platform. The battery may provide power to the computing device and any of the drive motors (216) and/or swerve motor (222) and sensors of the robotic system (200). In some embodiments, the battery may include one or more batteries or one or more battery packs to allow better distribution of mass across the mobile base assembly (210). In some embodiments, the battery may include a sealed lead acid battery or a Lithium-ion battery or Lithium Iron Phosphate battery. The computing device may include a processor, a memory, a communication interface, and one or more I/O interfaces. The memory can store computer-readable and executable instructions, which when executed by the processor causes the robotic system (200) to operate in an autonomous or semi-autonomous manner in regard to a particular task or in regard to sensor data received by the processor from one or more sensors of the robotic system (200).

Further, the mobile base assembly (210) may comprise sensors including, but not limited to, a laser rangefinder, a camera, or a sonar sensor. The laser rangefinder can spin to collect sensor data associated with a two-dimensional (2D) depth map of an environment, for example, the dockyard, warehouse, ocean container or truck, in which the robotic system (200) is operating. The design of the mobile base assembly (210) allows the laser rangefinder to collect sensor data over a wide field of view.

Still referring to FIGS. 5 and 6, the robotic system (200) comprises the dynamic conveyor (290) integrally formed with the mobile base assembly (210) of the robotic system (200). In accordance with the present disclosure, the dynamic conveyor (290) may be adapted to self-align a platform (291) of the dynamic conveyor (290) with respect to the goods/samples to be unloaded from/loaded on the ocean container/truck, thereby reducing the time and effort for unloading or loading of the goods/samples from the ocean container or truck or pallet or conveyors.

Within the scope of the present disclosure, the dynamic conveyor (290) may comprise a plurality of sensors and control unit for aligning the platform (291) of the dynamic conveyor (290) with respect to the goods/samples to be unloaded/loaded from the ocean container/truck/pallet or conveyor. The plurality of sensors includes, but not limited to, a laser rangefinder, a camera, or a sonar sensor. The plurality of sensors may be configured to collect sensor data associated with a position, for example, a height and/or depth, of the goods/sample to be unloaded/loaded from the ocean container/truck/pallet or conveyor. Further, the control unit may be communicatively coupled with the plurality of the sensors of the dynamic conveyor (290) for receiving the sensed data therefrom, and actuate, via an actuator (298), the platform (291) of the dynamic conveyor (290) for aligning the platform (291) with respect to the goods/sample to be unloaded from the ocean container/truck.

Referring to FIG. 6, the dynamic conveyor (290) comprises the platform (291) with sets of rollers (292, 293) provided at both ends of the platform (291) and a conveyor belt (294) adapted to rotate over the sets of rollers (292, 293) for conveying the goods. The conveyor belt (294) may be driven by an associated motor (not shown). The dynamic conveyor (290) further comprises a hinge assembly (296) provided at a first end of the platform (291) to facilitate a pivotal movement of the platform (291) relative to the mobile base assembly (210). The mobile base assembly (210) may comprise a set of columns (204) extending upwards from the base platform of the mobile base assembly (210). The platform (291) of the dynamic conveyor (290) may be pivotally coupled with the columns (204) of the mobile base assembly (210) via the hinge assembly (296). The hinge assembly (296) may facilitate a pivotal movement of the platform (291) of the dynamic conveyor (290) with respect to the mobile base assembly (210) in order to align the platform (291) with respect to the goods/sample to be unloaded from the ocean container/truck. The dynamic conveyor (290) furthermore comprises at least one connecting link (295). One end/a first end (297) of the connecting link (295) may be coupled to a lower surface of the platform (291) of the dynamic conveyor (290) and the other end/a second end (299) of the connecting link (295) may be movable along a rail unit (206) provided on the mobile base assembly (210) to raise or lower the platform (291) of the dynamic conveyor (290). The second end (299) of the connecting link (295) may be adapted to move along the rail unit (206) upon actuation of the actuator (298), for example, a motor (298), for raising or lowering the platform (291) of the dynamic conveyor (190) in order to align the platform (291) with respect to the goods/sample to be unloaded from the ocean container/truck. Within the scope of the present disclosure, the dynamic conveyor (290) may be adapted to extend along and upto a height and a width of the container. Further, the dynamic conveyor (290) may comprise a hydraulic actuator or an electrical actuator for controlling an operation or a position thereof.

In operation, upon receiving the sensed date from the plurality of sensors of the dynamic conveyor (290) and/or from the sensors of the mobile base assembly (210), the control unit of the dynamic conveyor (290) actuates the connecting link (295) in order to align the platform (291) of the dynamic conveyor (290) with respect to the goods/samples to be unloaded/loaded from the ocean container/truck/pallet or conveyor. Further, the dynamic conveyor (290) may comprise additional horizontal and/or inclined conveyor belts (not shown) coupled to the platform (291) so as to transfer the samples/boxes unloaded from the ocean container. In accordance with the present disclosure, the dynamic conveyor (290) associated with the mobile manipulation robotic system (200) of the present disclosure reduces the time and effort required for unloading or loading of the goods/samples from the trucks or ocean containers or pallet or conveyor, compared to the robotic systems/arms.

The robotic system (200) may further comprise the actuation assembly (230) configured to move relative to the mobile base assembly (210). The actuation assembly (230) may be arranged on the dynamic conveyor (290) and may be configured to translate horizontally over the dynamic conveyor (290) along a horizontal plane of the dynamic conveyor (290), in the forward and backward directions, such that the actuation assembly (230) is adapted to move linearly with respect to and over the mobile base assembly (210). In an embodiment, the actuation assembly (230) may comprise a vertical gantry structure configured to deploy a plurality of segments to reach, retrieve, or otherwise access the object, for example the goods/samples contained in the ocean container or truck or pallet or conveyor, for unloading and loading purposes.

In accordance with the present disclosure, the robotic system (200) comprises a first translation drive system (232) for movably coupling the actuation assembly (230) over the mobile base assembly (210). Particularly, the first translation drive system (232) is configured to move the actuation assembly (230) on the platform (291) of the dynamic conveyor (290). The first translation drive system (232) may comprise at least one upper guide (234), as shown in FIG. 6, affixed to a base plate (231) of the actuation assembly (230). The upper guide (234) may include a first stop. The first translation drive system (232) may further comprise at least one lower rail (236) affixed to a platform (291) of the dynamic conveyor (290). The lower rail (236) may include a second stop. Within the scope of the present disclosure, the at least one upper guide (234) may be operatively coupled to the corresponding lower rail (236) in order to enable the linear movement of the actuation assembly (230) on the platform (291) of the dynamic conveyor (290). The first translation drive system (232) may further comprise a linear actuator (not shown) attached to the actuation assembly (230). Upon actuation of the linear actuator, the actuation assembly (230) is translated in either a first direction or a second direction opposite the first direction on the platform (291) of the dynamic conveyor (290). In an embodiment, the first direction may correspond to the forward direction and the second direction may correspond to the backward direction along the horizontal plane of the mobile base assembly (210). In one exemplary embodiment, the linear actuator may include a ball screw that threadably engages a ball screw nut attached to the actuation assembly (230). In another embodiment, the linear actuator may include a motor (238), for example a stepper motor.

Further, the robotic system (200) may comprise ahead assembly (202) mounted atop the mobile base assembly (210). The head assembly (202) may comprise one or more sensors configured to collect sensor data with respect to an operational environment in which the robotic system (200) is located. For example, the head assembly (202) may collect sensor data associated with visual data of the samples/goods contained in the ocean container or the truck for which the robotic system (200) can be programmed (for unloading or loading of the container/truck). The head assembly (202) may be mounted atop the mobile base assembly (210) via a plate. A position of the head assembly (202) on the mobile base assembly (210) may be critical for environment-robot interaction, avoiding obstacles during navigation, and providing a downward-view during object manipulation or environment-robot interaction.

The head assembly (202) may include a sensor and a collection of peripheral devices or sensors, which may collectively represent a first collection of sensors. Sensors may include a depth finder, a camera, or a laser rangefinder. The collection of peripheral devices may also include a depth finder, a camera, or a laser rangefinder. By co-locating visual sensors, auditory sensors, and feedback devices, such as speakers, in the head assembly, a more robust autonomous experience is provided by directing verbal commands to the head assembly (202). The collection of sensors may collect sensor data associated with an operational environment in which the robotic system (200) is located, as well as specific objects within the operational environment that may be associated with a task being performed by the robotic system (200). The sensor may be supported by a support structure that may support or position the sensor in an inferior position relative to the support structure and the remainder of the head assembly (202). This inferior or underhung position can be advantageous to allow the sensor to articulate and provide a downward view of an object or environment without occlusion from other portions of the head assembly (202). The inferior or underhung configuration can also beneficially protect the sensor from damage during handling and/or shipping.

In an embodiment, the robotic system (200) may include at least one manipulation arm (270) coupled to the actuation assembly (230). For example, the exemplary embodiment of FIGS. 5 and 6 illustrates two manipulation arms (270). Each manipulation arm (270) may be coupled to the respective actuation assembly (230) such that the movement of the actuation assembly (230) along the horizontal plane of the mobile base assembly (210) effects a movement of the manipulation arm (270) along the horizontal plane of the mobile base assembly (210), i.e., the manipulation arm (270) linearly moves with respect to the platform (291) of the dynamic conveyor (290) for performing the task. The manipulation arm (270) is configured to reach, retrieve, or otherwise access the object, for example the goods/samples contained in the ocean container or truck or pallet or conveyor, for unloading and loading purposes. In an exemplary embodiment, the manipulation arm (270) comprises a plurality of arm links (271) and a manipulation payload or an end effector (280) coupled to the arm links (271), as shown in FIGS. 5 and 6. In accordance with the present disclosure, a first arm link (272) may be pivotably coupled to the actuation assembly (230) such that a movement of the first link (272) effects a movement of the manipulation arm (270)/or the plurality of arm links (271). Further, the other arm links may be pivotably coupled to each other. Further, the manipulation arm (270) may comprise one or more actuators (276), for example motors, operatively coupled with a respective arm link in order to effect pivotal movement of the arm links (271) with respect to each other and/or with respect to the actuation assembly (230).

Further, as shown in FIGS. 5 and 6, the manipulation payload (280) is coupled to a second arm link (274) at an end opposite to the first arm link (272). The manipulation payload (280) may include inter-changeable tools, actuators, and/or sensors. The manipulation payload (280) may comprise modular gripping tools or vacuum cups for grasping, holding and delivering the goods/samples for unloading or loading the goods from the ocean container or trucks or pallet or conveyor. The modular gripping tools may be changed according to a type of the goods contained in the container. The manipulation payload (280) may include a plurality of payload motors (282), for example three payload motors, and a payload drive mechanism. The payload drive mechanism may be actuated by the payload motors (282) and may actuate the manipulation tool/payload (280) or other inter-changeable device, which can be coupled to the payload drive mechanism. In an embodiment, the manipulation payload (280), the payload motors (282), and the payload drive mechanism can be configured in an offset configuration relative to the distal segment of the second arm link. The payload drive mechanism may provide rotational and translation degrees of freedom that are oriented parallel, perpendicular, inclined and/or rotatable to the surface on which the robotic system (200) is located. As such, the payload drive mechanism may advantageously enable the manipulation tool/payload (280) or other inter-changeable device coupled to the payload drive mechanism to be rotated out of a footprint of the mobile base assembly (210) during manipulation and then retracted back within the footprint during navigation or when stowed. In addition, the offset configuration of the manipulation payload (280) may make the components of the manipulation payload (280) more visible to the sensor in the head assembly (202).

The manipulation payload (280) may actuate in a yaw motion that may be achieved through actuation of a first motor of the payload motors (282) to cause the payload drive mechanism to rotate. The manipulation payload (280) may also actuate in a pitch motion that may be achieved through actuation of a second motor of the payload motors (282). The manipulation payload (280) may further actuate in a roll motion that may be achieved through actuation of a third motor of the payload motors (282). In some embodiments, the manipulation payload (280) may actuate in multiple degrees of freedom, such as a roll-pitch-roll motion, or a roll-pitch-yaw motion. Such complex movements can be achieved by sequential or concurrent actuation of the payload motors (282) for yaw motions, pitch motions, and roll motions.

In an embodiment, the control unit of the dynamic conveyor (290) may further be communicatively coupled with the sensors of the mobile base assembly (210), the actuation assembly (230), the head assembly (202), and the manipulation payload (280) for receiving the sensor data therefrom, and actuate, via the actuator (298), the connecting link (295) of the dynamic conveyor (290) for aligning the platform (291) of the dynamic conveyor (290) with respect to the goods/samples to be unloaded/loaded from the ocean container/truck/pallet or conveyor.

Furthermore, the robotic system (200) may include a computing device (not shown) comprising a data processor and a memory storing non-transitory computer-readable instructions which can be executed by the data processor. The computing device may also include one or more controllers and a communication interface. The computing device may be coupled to a power supply located in the mobile base assembly (210), such as the battery. The power supply may be coupled to one or more sensors and to one or more actuators. The one or more sensors may transmit sensor data to the computing device. The actuators may include the first drive motor (216), the second drive motor, the swerve motor (222), the stepper motor/linear actuator, the actuator (276) and the payload motors (282), which may be coupled to the computing device and may receive control commands from the computing device. Each of the said actuators may be configured with a low gear ratio and coupled to a corresponding controller of the controllers. Each motor can be individually controlled via the corresponding controller to actuate according to a control command provided from the computing device. The one or more controllers may include a current controller, a force controller, and/or a position controller. The current controller can be configured to generate actuation signals in response to input signals received from the force controller. The actuation signals can be provided to the first drive motor (216), the second drive motor, the swerve motor (222), the stepper motor/linear actuator, the actuator (276) and the payload motors (282). The force controller can receive inputs associated with a measured interaction force (Fi), a maximum interaction force (Fm), and a desired/objective output force (Fo). The position controller can be configured to output the desired or objective output force (Fo) based on inputs of measured and desired/objective position/location data associated with a position/location of the vertical gantry structure and/or the mobile base assembly.

The first drive motor (216), the second drive motor, the swerve motor (222), the stepper motor/linear actuator, the actuator (276) and the payload motors (282) may include closed loop current feedback control for actuation of the first and second drive wheels (212) and holonomic wheels (220) in the mobile base assembly (210), the linear actuator for the first translation drive system (232), and the actuator (276) and the payload motors (282) for the manipulation arm (270). Stepper motors can be configured to generate high torque at low speeds, allowing lower gear ratio transmissions or gear trains to be used. The robotic system (200) may control coil current based on feedback associated with a rotor position of the corresponding motor. The rotor position can be measured via a Hall effect sensor and a magnet mounted to the motor. The closed loop current feedback control allows instantaneous actuator current to be determined. In some embodiments, the closed loop current feedback control can be implemented by a position and/or velocity control loop of the motor using a proportional-integral-derivative (PID) control loop mechanism.

In an embodiment, the computing device may be coupled to a second computing device via a network. The second computing device may be located remotely from the robotic system (200). In some embodiments, the robotic system (200) may include the second computing device that may comprise a data processor, a memory storing non-transitory computer-readable instructions, a communication interface, an input device and a display including a graphical user interface. The second computing device may be configured to receive user inputs and to generate control commands to control the robotic system (200) to perform a task, to navigate an environment, or to transmit sensor data to the second computing device. The second computing device may receive the user input via the input device and/or the GUI. The user inputs can be processed and transmitted via the communication interface to the communication interface of the first computing device. In some embodiments, the communication interfaces may be wired communication interfaces or wireless communication interfaces. Once received, the robotic system (200) may be configured to generate an actuation signal responsive to the user input causing the robotic system (200) to actuate. In some embodiments, the input device may include a joystick, a keyboard, a mouse, or a touchscreen.

In accordance with the mobile manipulation robotic system of the present disclosure, the reduced footprint design and efficient mechanical configuration of components make the mobile manipulation robotic system compact and easily retrofittable. The mobile manipulation robotic system described herein is adapted to access a larger range of distance using a horizontally and vertically articulating gantry structure compared to traditional assistive robots. In fact, compared to the traditional assistive robotic systems, an increased number of robotic systems (200), for example, two or three robotic systems (200), may enter into the ocean container of the same size and work/coordinate synchronously for unloading or loading of the goods/samples from the ocean container or trucks or pallet or conveyors.

Also, in comparison to a typical robotic manipulator system or robotic arm where the base motor works against the maximum torque, even when the motion of the end effector is in a horizontal plane, the mobile manipulation robotic system of the present disclosure divides the rotational motion in two axes, i.e., horizontal and vertical. In the robotic system of the present disclosure, the horizontal travel of the end effector eliminates the need of high power thereby a powerful base motor is not required. Also, the vertical gantry, due to a simplified counter-weight system, balances the dead weight of the robotic system, thereby eliminating the need of a high power for the vertical movement. Thus, the mobile manipulation robotic system of the present disclosure requires low power and is cost effective.

Further, the dynamic conveyor associated with the mobile manipulation robotic system of the present disclosure reduces the time and effort required for unloading/loading of the goods from the trucks or ocean containers.

The mobile manipulation robotic system of the present disclosure provides more robust performance completing everyday tasks in warehouse and dockyard environments.

The various embodiments of the present disclosure have been described above with reference to the accompanying drawings. The present disclosure is not limited to the illustrated embodiments; rather, these embodiments are intended to fully and completely disclose the subject matter of the disclosure to those skilled in this art. In the drawings, like numbers refer to like elements throughout. Thicknesses and dimensions of some components may be exaggerated for clarity.

Herein, the terms "attached", "connected", "interconnected", "contacting", "mounted", "coupled" and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

REFERENCE NUMERALS

| PARTICULARS | REFERRAL NUMERAL |
|---|---|
| Mobile Manipulation Robotic System | 100, 200 |
| Head Assembly | 102, 202 |
| Mobile Base Assembly | 110, 210 |
| Top Plate | 111 |
| First Drive Wheel | 112, 212 |
| Second Drive Wheel | 114 |
| First Drive Motor | 116, 216 |
| Second Drive Motor | 118 |
| Holonomic Wheels | 120, 220 |
| Swerve Motor | 122, 222 |
| Actuation Assembly | 130, 230 |
| Base Plate | 131, 231 |
| First Translation Drive System | 132, 232 |
| Upper Guide | 134, 234 |
| Lower Rail | 136, 236 |
| Linear Actuator | 138 |
| Rotational Drive System | 140 |
| Vertical Gantry Structure | 150 |
| Second Translation Drive System | 152 |
| Chain Cartridge | 154 |
| Pinion | 155 |
| Drive Chain | 156 |
| Chain Motor | 158 |
| Counter Weight | 159 |
| Lift Carriage | 160 |
| Manipulation Arm | 170, 270 |
| First Arm Link | 172, 272 |
| Second Arm Link | 174, 274 |
| Actuator | 176, 276 |
| Manipulation Payload | 180, 280 |
| Payload Motors | 182, 282 |
| Dynamic Conveyor | 190, 190', 290 |
| Platform | 191, 191', 291 |
| Scissors Legs | 192 |
| Lower Frame | 193 |
| Horizontal Conveyor Belt | 194 |
| Inclined Conveyor Belt | 196 |
| Actuator | 198, 198', 298 |
| Columns | 204 |
| Rail unit | 106', 206 |
| Plurality of Arm Links | 271 |
| Rollers | 292, 293 |
| Conveyor Belt | 294 |
| Hinge Assembly | 296 |
| First End | 197', 297 |
| Connecting Link | 195', 295 |
| Second End | 199', 299 |
| Longitudinal Axis | X-X' |

EQUIVALENTS

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

What is claimed is:

1. A robotic system configured for performing a task of loading and unloading goods, the robotic system comprising:
   a mobile base assembly;
   an actuation assembly coupled to the mobile base assembly and configured to move with respect to the mobile base assembly;
   a head assembly mounted atop the actuation assembly or the mobile base assembly, the head assembly comprising one or more sensors configured to collect data related to an operation environment and the task to be performed;
   a dynamic conveyor coupled to the mobile base assembly, the dynamic conveyor comprising a platform;
   a control unit configured to receive sensor data indicative of a height of an object on an opposite side of the platform from the mobile base assembly, and to move the platform vertically to align the platform with the height of the object; and
   a manipulation arm coupled to the actuation assembly or the dynamic conveyor and configured to move to extend over and across the platform and move the object to the platform while the platform is aligned with the height of the object.

2. The robotic system as claimed in claim 1, wherein the dynamic conveyor comprises a plurality of sensors and the control unit, wherein the control unit is communicatively coupled to the plurality of sensors,
   wherein the plurality of sensors is configured to collect the sensor data indicative of the height of the object, and
   wherein the control unit is configured to actuate, by an actuator, the platform to align the platform of the dynamic conveyor with the height of the object, based on the sensor data received from the plurality of sensors.

3. The robotic system as claimed in claim 2, wherein the control unit is communicatively coupled to sensors in at least one of the mobile base assembly, the actuation assembly, the head assembly, or the manipulation arm for receiving additional data related to the operation environment and the task, and
   wherein the control unit is configured to align the platform with respect to the object, based on the additional data received from the sensors in at least one of the mobile base assembly, the actuation assembly, the head assembly, or the manipulation arm.

4. The robotic system as claimed in claim 1, wherein the platform comprises:
   sets of rollers provided at a first end and a second end of the platform, and
   a conveyor belt adapted to rotate over the sets of rollers for conveying the goods, and
   wherein the dynamic conveyer comprises:
   a hinge assembly provided at the first end of the platform, the hinge assembly configured to facilitate a pivotal movement of the platform relative to the mobile base assembly; and
   at least one connecting link comprising
   a first end coupled to a lower surface of the platform of the dynamic conveyor, and
   a second end movable along a rail unit on the mobile base assembly,
   wherein movement of the second end of the connecting links causes the platform to be raised or lowered.

5. The robotic system as claimed in claim 4, comprising a container containing the object, wherein the dynamic conveyor extends along a full width of the container and up to a full height of the container.

6. The robotic system as claimed in claim 4, wherein the dynamic conveyor comprises a hydraulic actuator or an electrical actuator.

7. The robotic system as claimed in claim 1, wherein the dynamic conveyor comprises a scissors-type dynamic conveyor that comprises pairs of scissors-legs pivotally coupled to each other about scissors pivot axes, the scissors-type dynamic conveyor adapted to extend and retract the pairs of scissors-legs along a vertical direction and a horizontal direction.

8. The robotic system as claimed in claim 1, wherein the manipulation arm is configured to move linearly with respect to the dynamic conveyor.

9. The robotic system as claimed in claim 1, wherein the dynamic conveyor forms an integral unit with the mobile base assembly.

10. The robotic system as claimed in claim 1, wherein the manipulation arm is coupled to a lift carriage of the actuation assembly,
    wherein the lift carriage is adapted to move the manipulation arm along a vertical axis of the actuation assembly.

11. The robotic system as claimed in claim 10, wherein the actuation assembly comprises a translation drive system comprising a drive chain housed within a chain cartridge and operated by a drive motor, wherein the translation drive system is configured to move the lift carriage and the manipulation arm along the vertical axis of the actuation assembly.

12. The robotic system as claimed in claim 1, wherein the manipulation arm comprises a plurality of arm links and a manipulation payload pivotably coupled to one another and controlled by at least one motor.

13. The robotic system as claimed in claim 12, wherein the manipulation payload comprises a vacuum cup or a modular gripping tool, and wherein the manipulation payload is configured to receive different modular gripping tools for different types of the goods.

14. The robotic system as claimed in claim 1, wherein the actuation assembly is adapted to:
    move linearly, by a first translation drive system, over the mobile base assembly along a horizontal plane, and/or rotate, by a rotational drive system, over the mobile base assembly, about a longitudinal axis of the actuation assembly.

15. The robotic system as claimed in claim 14, wherein the first translation drive system comprises:
   at least one upper guide affixed to a base plate of the actuation assembly; and
   at least one lower rail affixed to a top plate of the mobile base assembly,
   wherein a first upper guide of the at least one upper guide is coupled to a corresponding lower rail to facilitate a linear movement of the actuation assembly with respect to the mobile base assembly.

16. The robotic system as claimed in claim 15, wherein the first translation drive system comprises an actuator configured to move the at least one upper guide relative to the at least one lower rail to move the actuation assembly relative to the mobile base assembly.

17. The robotic system as claimed in claim 14, wherein the rotational drive system comprises a bearing unit coupled to a base plate of the actuation assembly and a top plate of the mobile base assembly, the bearing unit comprising:
   an outer race coupled to the top plate of the mobile base assembly; and
   an inner race coupled to the base plate of the actuation assembly,
   wherein the inner race is rotatable with respect to the outer race in order to rotate the actuation assembly with respect to the mobile base assembly.

18. The robotic system as claimed in claim 17, wherein the rotational drive system comprises a motor operatively coupled to the bearing unit and adapted to actuate rotation of the inner race with respect to the outer race.

19. The robotic system as claimed in claim 1, wherein the mobile base assembly comprises a plurality of drive wheels, each drive wheel operable by a respective drive motor, to facilitate movement of the mobile base assembly.

20. The robotic system as claimed in claim 19, wherein the drive motors are configured to operate in unison and independently of each other.

21. A robotic system for handling objects, the robotic system comprising:
   a base;
   a manipulation arm mounted on the base, the manipulation arm comprising at least two arm links pivotably coupled to one another;
   a vacuum unit at a distal end of the manipulation arm, the vacuum unit configured to attach to a portion of the objects;
   a dynamic conveyer comprising:
   a motorized platform arranged adjacent to the base, such that the manipulation arm is extendable over and across the motorized platform and configured to handle one or more objects on an opposite side of the motorized platform from the base, and
   a motorized conveyer belt on the motorized platform, the motorized conveyer belt configured to move goods placed on the motorized conveyer belt;
   at least one sensor configured to collect sensor data indicative of a first height of an object to be handled; and
   at least one control device configured to:
   move the motorized platform up or down, based on the sensor data, to align the motorized platform with the first height of the object,
   control the manipulation arm to extend over and across the motorized platform, attach to the object, and move the object to the motorized conveyer belt while the motorized platform is aligned with the first height of the object, and
   control the motorized conveyer belt to move the object.

22. The robotic system as claimed in claim 21, wherein the motorized conveyer belt is oriented horizontally.

23. The robotic system as claimed in claim 22, wherein the motorized conveyer belt is a first motorized conveyer belt, and wherein the dynamic conveyer comprises an inclined motorized conveyer belt coupled to the first motorized conveyer belt and arranged downstream of the first motorized conveyer belt to receive the object moved by the first motorized conveyer belt.

24. The robotic system as claimed in claim 23, wherein the inclined motorized conveyer belt, in a downstream direction, tilts downward from a vertical level of the first motorized conveyer belt.

25. The robotic system as claimed in claim 23, wherein the first motorized conveyer belt extends along a first side of the base, and
   wherein the inclined motorized conveyer belt extends along a second side of the base, the second side adjacent to the first side.

26. The robotic system as claimed in claim 23, wherein the first motorized conveyer belt and the inclined motorized conveyer belt are coupled via a platform having a rectangular top surface.

27. The robotic system as claimed in claim 23, wherein the first motorized conveyer belt and the inclined motorized conveyer belt are driven by separate motors.

28. The robotic system as claimed in claim 21, comprising a pair of scissor legs pivotally coupled about a pivot axis,
   wherein pivoting of the pair of scissor legs about the pivot axis causes vertical movement of the motorized platform.

29. The robotic system as claimed in claim 21, wherein the motorized platform is hydraulically-driven or electrically-driven.

30. The robotic system as claimed in claim 21, wherein the at least one sensor comprises a camera.

\* \* \* \* \*